United States Patent [19]
Rothrock
[11] 4,372,340
[45] Feb. 8, 1983

[54] LIQUID STORAGE TANK

[75] Inventor: Elmer W. Rothrock, Hinsdale, Ill.
[73] Assignee: Chicago Bridge & Iron Company, Oak Brook, Ill.

[21] Appl. No.: 191,505
[22] Filed: Sep. 29, 1980
[51] Int. Cl.³ ..... F16K 21/04
[52] U.S. Cl. ..... 137/576; 137/395; 62/45
[58] Field of Search ..... 137/571, 572, 576, 386, 137/396, 264, 399, 391, 400; 62/45

[56] References Cited

U.S. PATENT DOCUMENTS

| | | | |
|---|---|---|---|
| 763,115 | 6/1904 | Robinson | 137/399 |
| 1,016,516 | 2/1912 | Norris | 137/399 |
| 1,283,916 | 11/1918 | Rogers | 137/399 |
| 1,487,280 | 3/1924 | Skaarnas | 137/576 |
| 1,548,298 | 8/1925 | Woodward | 137/399 |
| 3,070,963 | 1/1963 | Dubouchet | 137/386 |
| 3,326,011 | 6/1967 | Sparling | 62/45 |
| 3,353,552 | 11/1967 | Rowley | 137/576 |
| 3,416,325 | 12/1968 | Nelson | 62/45 |

*Primary Examiner*—A. Michael Chambers
*Attorney, Agent, or Firm*—Merriam, Marshall & Bicknell

[57] ABSTRACT

A storage tank having internal and external spaced apart walls defining a first liquid storage space between the two walls and a second liquid storage space surrounded by the internal wall; each of the internal and external walls being joined to a bottom; at least one fluid conduit in fluid flow communication with and between the first and second storage spaces; and a valve capable of blocking fluid flow through the fluid conduit from the second storage space to the first storage space which is actuated by a sudden loss of liquid from the first storage space to outside of the tank.

11 Claims, 3 Drawing Figures

LIQUID STORAGE TANK

This invention relates to liquid storage tanks. More particularly, this invention is concerned with a storage tank which will maintain liquid storage integrity of most of the tank contents if the primary tank shell suddenly fails for any reason.

BACKGROUND OF THE INVENTION

Storage tanks are widely used industrially and by governmental bodies for the storage of many different liquids. Many of the stored liquids are highly flammable, such as gasoline, benzene, and diesel fuel, as well as liquids obtained by liquefaction of otherwise normally gaseous materials, such as liquefied natural gas, propane, butane, ethylene and propylene. Storage tanks for such materials generally are surrounded by a moat or trench defined by a dike spaced away from the tank. Were such a tank to fail and stored liquid escape, the liquid would flow into the moat and be prevented from spreading any further. While such a safety approach is predicated on containing the liquid and any resulting fire, it assumes a willingness to sacrifice the entire liquid contents of the tank. This is undesirable from a safety position because of the extended time needed to burn off the escaped liquid or to recover it if no fire results. It is also undesirable from an economical viewpoint because most of the stored liquids are very valuable now and are increasing in value at least year to year. Accordingly, a need exists for a storage tank of increased containment integrity which will retain nearly all of its stored liquid content if the tank fails and some liquid escapes to the tank exterior.

SUMMARY OF THE INVENTION

According to the present invention, there is provided a storage tank comprising internal and external spaced apart walls defining a first liquid storage space between the two walls and a second liquid storage space surrounded by the internal wall; each of the internal and external walls being joined to a bottom; at least one fluid conduit means in fluid flow communication with and between the first and second storage spaces; and valve means capable of blocking fluid flow through the fluid conduit means from the second storage space to the first storage space which is actuated by a sudden loss of liquid from the first storage space to outside the tank.

The valve means desirably is actuated upon development of a differential liquid head between a lower liquid head in the first storage space and a higher liquid head in the second storage space. Thus, a higher static liquid pressure in the second storage space than in the first storage space can actuate the valve means to close the conduit means to fluid flow.

Generally a plurality of fluid conduits are positioned in fluid flow communication with and between the first and second storage spaces and each fluid conduit is provided with a valve means and the previously described capability. Desirably, each fluid conduit means is located at or near the bottom of the internal wall but above the tank bottom. The conduit means, however, can run beneath the lower edge of the internal wall in a curved manner and then penetrate the tank bottom or bottoms.

The tank internal and external walls can be joined to the same bottom, or the internal wall can be joined to one bottom and the external wall joined to a separate bottom.

A roof can be supported by, and joined to, the external wall. In addition, an internal roof can be positioned to extend over the area surrounded by the internal wall to enclose the second liquid storage space.

A moat is desirably provided around the tank exterior with a liquid capacity at least equal to that of the first storage space so that liquid which escapes, before the valve is closed, is retained.

The invention is particularly useful in tanks in which the internal and external walls are axially arranged vertical cylindrical shells.

DETAILED DESCRIPTION OF THE DRAWINGS

To the extent it is practical and convenient, the same or similar elements or parts appearing in the various views of the drawings will be identified by the same numbers.

Figure 1:
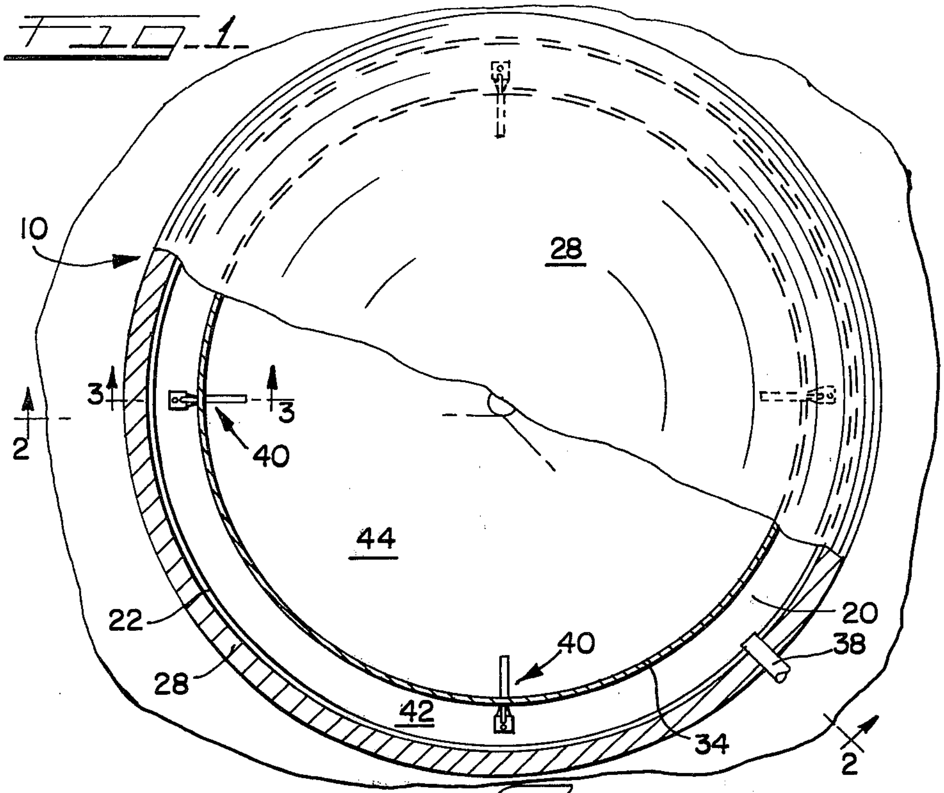
FIG. 1 is a plan view, partially broken away and in section, of a storage tank provided by the invention.
Figure 2:
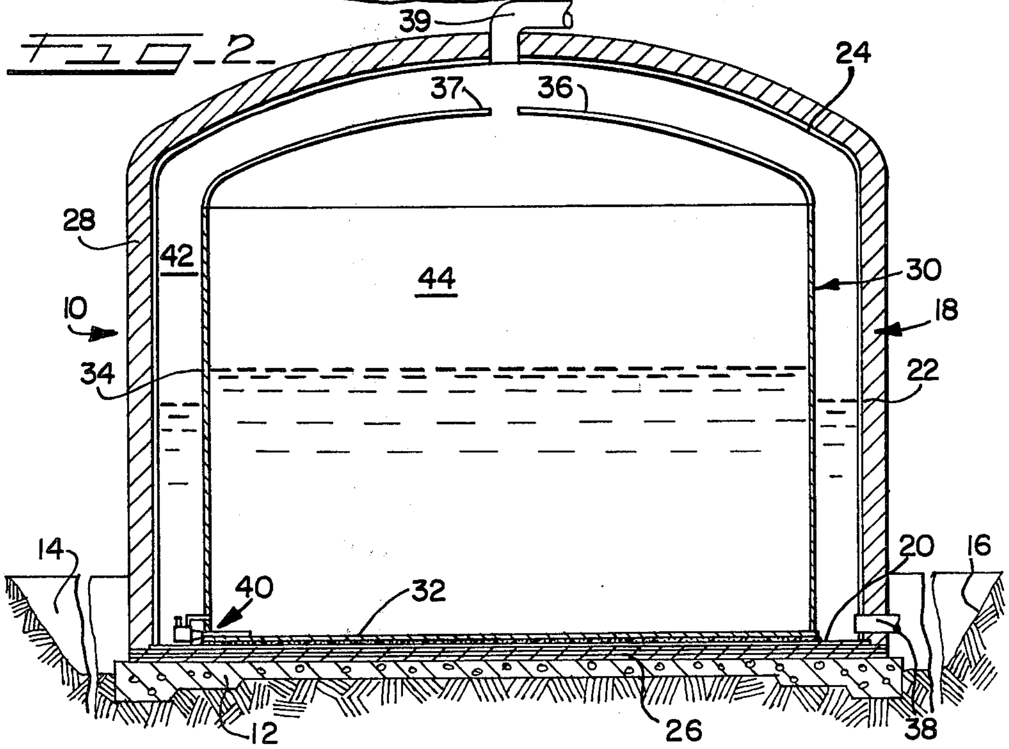
FIG. 2 is a sectional view taken along the line 2—2 of FIG. 1.

With reference to FIGS. 1 and 2, the storage tank 10 rests on a concrete foundation 12 located at the bottom of a circular pit. Moat 14, formed by earthen wall 16 and the side of the tank, surrounds the tank in a ring-like manner.

The storage tank 10 includes a primary container 18 which includes a flat metal bottom 20 to which the lower edge of vertical cylindrical wall 22 is joined, such as by welding. Domed roof 24 is supported by, and is joined to, the upper edge of wall 22.

Insulation 26 can be positioned between bottom 20 and foundation 12 to retard heat leak when that is undesirable, such as when the tank is intended to store a liquefied gas. Similary, the wall 22 and roof 24 can be covered by insulation 28 to retard heat leak into, or even out of, the tank if that is desirable.

Inside of primary container 18 is located a secondary container 30 having a metal bottom 32, a vertical cylindrical wall 34 joined at its lower edge to bottom, 32, and a roof 36 joined to the top edge of wall 34. A suitable grout 35 can be placed between bottom 32 and primary container bottom 20 to provide uniform load bearing support.

Conduit 38 provides a means for feeding a liquid into, and removing it from, tank 10. Vents 37 and 39 are provided in the inner and outer roofs 36 and 24 as may be needed to vent off vapor or gas and to supply gas to the tank interior as stored product is withdrawn from the tank. The buildup of a pressure differential which could damage the tank walls is thereby avoided.

At least one, and generally a plurality of, fluid conduits 40 are in fluid flow communication with and between a first liquid storage space 42 between the two walls 22 and 24 and a second liquid storage space 44 surrounded by the internal wall 34. The fluid conduits 40 are generally placed at or near the bottom of wall 34. When liquid is fed to tank 10 by conduit 38, the liquid level is maintained the same in both storage spaces 42 and 44 because liquid can always flow through conduit 40 from the first storage space 42 inwardly to the second storage space 44. Furthermore, liquid flow from the second storage space 44, through conduits 40, into the first storage space 42 is intended to be unrestricted during normal, controlled withdrawal of liquid from the tank through conduit 40. However, if for any reason there is a rapid loss of liquid from the first storage space 42, valve 50 will automatically close conduit 40 against liquid flow from the second storage space 44 to the first storage space 42.

Figure 3:
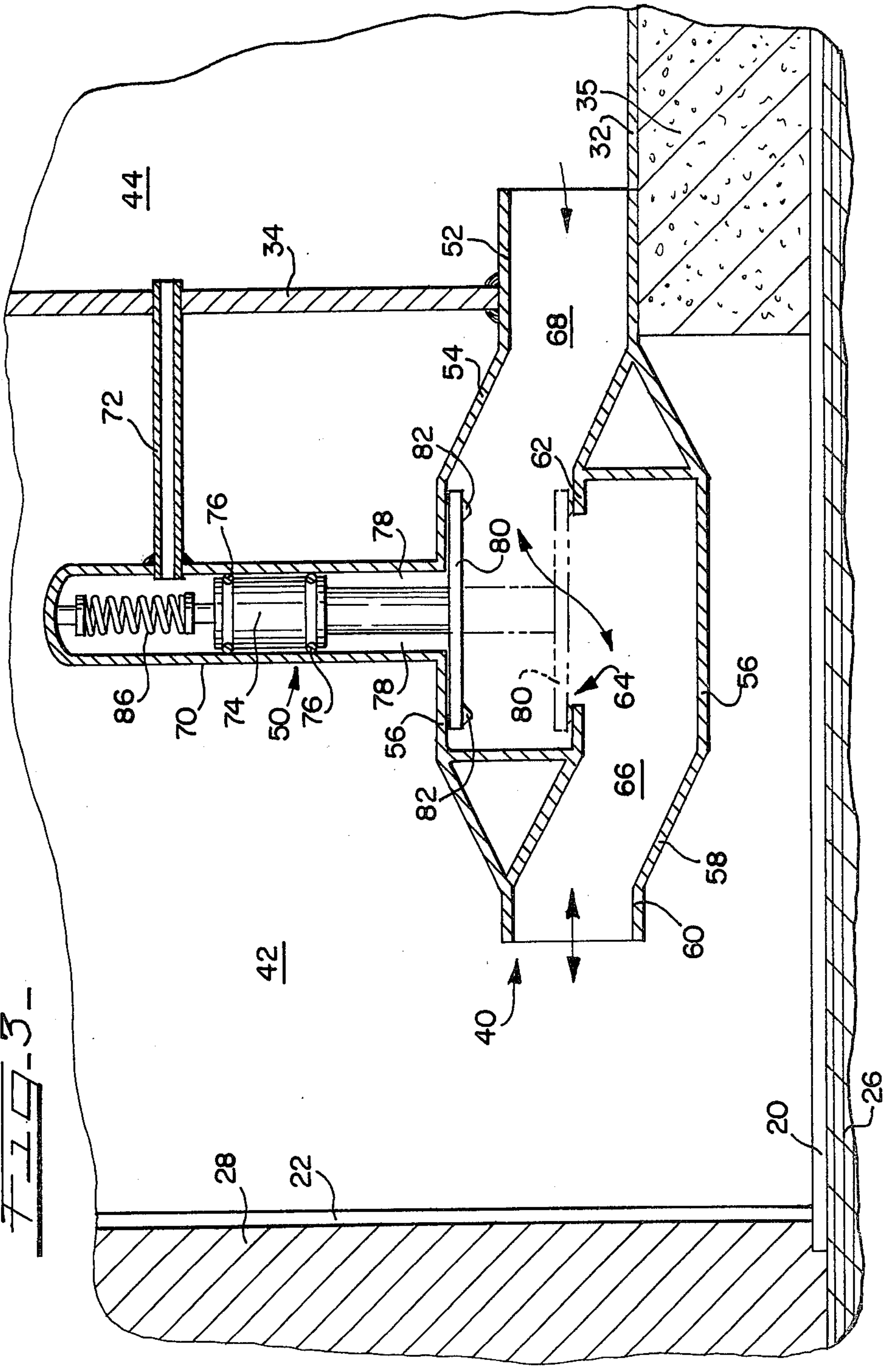
FIG. 3 is a sectional view taken along the line 3—3 of FIG. 1.

As shown in FIG. 3, the conduit 40 has a circular cylindrical inner end 52, which extends through internal wall 34, which is connected to a truncated conical portion 54. Circular cylindrical portion 56 is joined at its inner end to truncated conical portion 54 and at its outer end to truncated conical portion 58 which communicates with circular cylindrical portion 60. Valve seat 62 surrounds a circular hole 64 which places passages 66 and 68 in fluid flow communication.

Extending upwardly from the top of valve cylindrical portion 56 is tube 70 which is closed at the top. The lower end of tube 70 is open and is in communication with passage 68. Pipe 72 extends through inner wall 34 and the upper part of tube 70 so that liquid can flow from second storage space 44 into the upper portion of pipe 72.

Piston 74, having O-ring seals 76, is slidably mounted inside of tube 70. Rods 78 extend downwardly from the bottom of piston 74 and are connected to horizontal circular plate 80 having on the bottom an elastomeric seal 82 which is sized to contact seat 62. Tension spring 86 is connected to the top of tube 70 and at the bottom to the top of piston 74. Spring 86 is sized to maintain plate 80 in its uppermost position during normal operation of the tank.

Regardless of how full of liquid the tank is at any one time during normal operation, the liquid level in the first and second storage spaces 42 and 44 is the same. If a sudden loss of liquid occurs in the first storage space 42, such as through failure of outer wall 22, the liquid level in space 42 will drop suddenly leaving the liquid level in second storage space 44 at a higher level. The difference in liquid levels creates a pressure difference between the two storage spaces which automatically activates valve 50. Fluid flowing from passage 68 through hole 64 is at a lower pressure than the liquid fed by pipe 72 to the top of piston 74. The liquid fed by pipe 72 into the top of tube 70 forces piston 74 downwardly and that movement displaces plate 80 into contact with seat 62 thereby preventing more liquid from flowing out of space 44. Valve 50 will remain closed as long as a difference in liquid levels exists. As a result, the internal shell comprising bottom 32 and wall 34 serves in the capacity of a dike or retainer pond to hold a previously designated portion of the stored product in the event of a rupture of the primary container bottom 20 or wall 22. Thus, the maximum quantity of stored liquid released to the external moat or earthen dike is pre-set by the design of the facility. The moat will generally be constructed to have a liquid capacity at least equal to that of the first storage space.

The storage tank described in conjunction with the drawings provides increased containment integrity and thus is highly useful for storing flammable liquids.

The foregoing detailed description has been given for clearness of understanding only, and no unnecessary limitations should be understood therefrom as modifications will be obvious to those skilled in the art.

What is claimed is:

1. A storage tank comprising:

internal and external spaced apart walls defining a first liquid storage space between the two walls and a second liquid storage space surrounded by the internal wall;

each of the internal and external walls being joined to a bottom;

the first and second liquid storage spaces being adapted to store liquid in each at the same height at maximum capacity;

at least one fluid conduit means in fluid flow communication with and between the first and second storage spaces; and valve means disposed in one of said storage spaces, normally open regardless of the liquid level in the second liquid storage space, capable of blocking fluid flow through the fluid conduit means from the second storage space to the first storage space and including means responsive to the liquid level in said second storage space for closing said valve means upon loss of liquid from the first storage space to outside the tank.

2. A storage tank according to claim 1 in which the internal and external walls are joined to the same bottom.

3. A storage tank according to claim 1 in which the internal wall is joined to one bottom and the external wall is joined to a separate bottom.

4. A storage tank according to claim 1 in which a roof is supported by, and is joined to, the external wall.

5. A storage tank according to claim 4 in which an internal roof extends over the area surrounded by the internal wall and encloses the second liquid storage space.

6. A storage tank according to claim 1 in which the valve means is actuated upon development of a differential liquid head between a lower liquid head in the first storage space and a higher liquid head in the second storage space.

7. A storage tank according to claim 1 in which a plurality of fluid conduits are in fluid flow communication with and between the first and second storage spaces and each fluid conduit contains a described valve means.

8. A storage tank according to claim 1 in which the fluid conduit means is located at the bottom of the internal wall.

9. A storage tank according to claim 6 in which a higher static liquid pressure in the second storage space than in the first storage space actuates the valve means to close the conduit means to fluid flow.

10. A storage tank according to claim 1 including a moat, around the tank exterior, having a liquid capacity at least equal to that of the first storage space.

11. A storage tank according to claim 1 in which the internal and external walls are axially arranged cylindrical shells.

* * * * *